United States Patent Office.

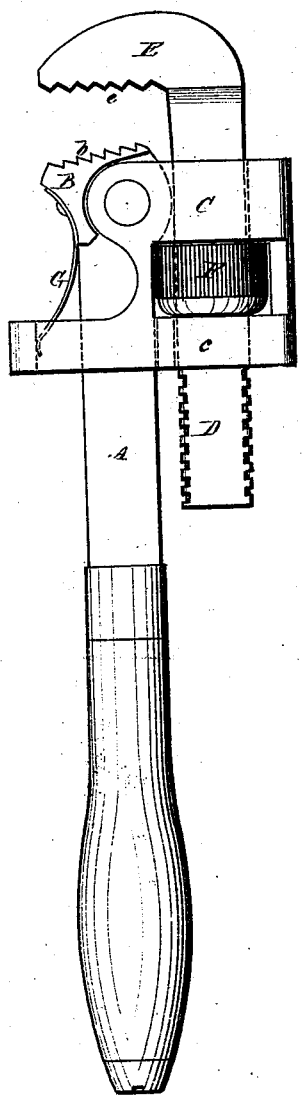

DANIEL C. STILLSON, OF CHARLESTOWN, MASSACHUSETTS.

*Letters Patent No. 95,744, dated October 12, 1869.*

IMPROVEMENT IN WRENCH.

The Schedule referred to in these Letters Patent and making part of the same.

*To all whom it may concern:*

Be it known that I, DANIEL C. STILLSON, of Charlestown, in the county of Middlesex, and in the State of Massachusetts, have invented certain new and useful Improvements in Pipe-Wrenches; and I do hereby declare that the following is a full, clear, and exact description thereof, reference being had to the accompanying drawing, making a part of this specification, in which is shown a side elevation of my improved device.

My invention belongs to a class of devices termed pipe-wrenches; and

It consists in the peculiar form and arrangement of the fixed and adjustable jaws, and in the manner of connecting them together, substantially as hereinafter specified.

In the annexed drawing—

A represents the shank of the wrench, the upper end of which, B, inclines slightly to the front, and is provided with a series of transverse teeth, *b*, which rake forward, said end forming the lower or fixed jaw.

Pivoted to the jaw B, upon its rear side, is a hollow frame, C, the lower part of which, *c*, extends forward, so as to embrace the shank A, while the rear portion furnishes a housing for the shank D of the adjustable jaw E.

The shank D is provided with a male screw-thread, and passes through a corresponding nut, F, placed within a transverse groove in the frame, so that by turning said nut to the right or left, the shank and jaw will be correspondingly raised or lowered.

The inner face of the adjustable jaw E is placed at a right angle to the shanks A and D, and is also provided with transverse teeth *e*, which rake to the rear, or in any opposite direction from those upon the adjustable jaw.

The lower part of the frame *c* extends forward of the shank A, and is recessed out, so as to permit said lower part to swing to the rear, by which means the relative angles of the inner faces of the jaws are changed, the length of said recess being such as to permit said lower part *c* to swing to the rear a sufficient distance only to bring said jaws nearly or quite parallel with each other.

A spring, G, is secured to the front side of the shank A, and, pressing against the forward end of the recess within the part *c*, holds the frame in the position shown in the drawing, except when changed by the operation of the wrench.

As thus constructed, the wrench is complete, and its operation is as follows:

The jaws B and E being adjusted so as to permit the pipe to pass between, nearly to the shank D, the handle is pressed forward, and, turning upon the pivot connecting it with the frame, shuts the jaws together, firmly clasping said pipe between them.

The front end of the lower part *c*, striking against the shank A, arrests the motion of the frame and jaws, and thus prevents the latter from crushing the pipe, as would otherwise be the case. The pipe is instantly released by removing the pressure from the handle, so as to permit the wrench to be rotated upon or removed from said pipe.

The especial advantages possessed by this wrench consist in the ease with which it is adjusted upon a pipe and the certainty of its operation, in addition to which the strength and simplicity of the parts insures great durability at a moderate cost.

Having thus fully set forth the nature and merits of my improvement,

What I claim as new, and desire to secure by Letters Patent, is—

The within-described wrench, consisting of the shanks A and D, the jaws B and E, the frame C, the nut F, and the spring G, substantially as herein shown and specified.

Also, the frame C, pivoted to or upon the shank A, and provided with the slotted part *c*, enclosing the shanks A and D, by means of which the jaws B and E are permitted to close upon but not crush a pipe, substantially as herein specified.

In testimony that I claim the foregoing, I have hereunto set my hand, this 11th day of September, 1869.

DANIEL C. STILLSON.

Witnesses:
W. W. MOSHER,
JOSEPH H. COTTON.